Oct. 15, 1963  E. W. SCHOEFFEL ETAL  3,107,142
SODIUM HYDROXIDE RECOVERY
Filed Dec. 23, 1958
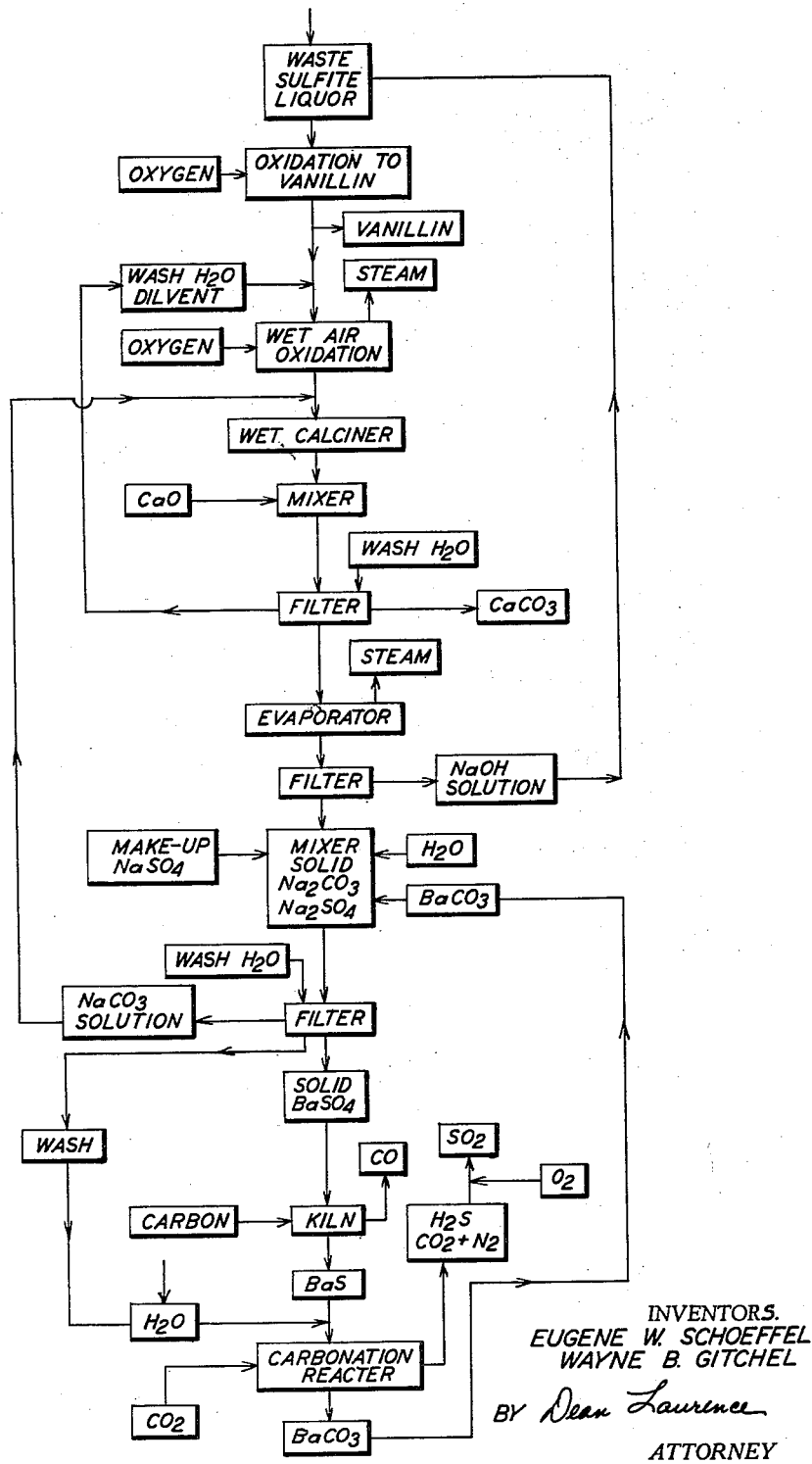
INVENTORS.
EUGENE W. SCHOEFFEL
WAYNE B. GITCHEL
BY Dean Laurence
ATTORNEY United States Patent Office 3,107,142
Patented Oct. 15, 1963

3,107,142
SODIUM HYDROXIDE RECOVERY
Eugene W. Schoeffel, Kronenwetter, and Wayne B. Gitchel, Rothschild, Wis., assignors to Sterling Drug Inc., New York, N.Y., a corporation of Delaware
Filed Dec. 23, 1958, Ser. No. 782,582
4 Claims. (Cl. 23—49)

This invention relates to processes for recovering sodium compounds from industrial wastes.

More particularly, this invention relates to processes for recovering separate solutions of sodium hydroxide and sodium carbonate from industrial wastes.

In the digestion of wood chips to form wood pulp, aqueous solutions of sodium hydroxide are used as digesting agents. Subsequent to the digestion step, the wood pulp is separated from the liquor. The liquor contains sodium compounds, organic matter, alkalies, sulfides, carbonates, thiosulfates, sulfates and miscellaneous sulfur acid salts. It is an object of the present invention to provide a process for recovering from such liquor a purified sodium hydroxide solution that can be recycled to the wood pulping step.

Another process of digestion of wood chips to form wood pulp involves cooking the wood chips with an aqueous solution of calcium bisulfite. After the cooking step, the wood pulp is separated from the liquor. The waste sulfite liquor contains lignosulfonic materials which can be oxidized to produce vanillin. Before oxidation to produce vanillin, the sulfite liquor can be subjected to fermentation to produce ethyl alcohol. The ethyl alcohol can be removed by distillation. The residue remaining after distillation is an alcohol-stripped fermented waste sulfite liquor that contains lignosulfonic materials which can be oxidized to produce vanillin by the action of oxygen gas as set forth in United States Patent No. 2,576,752 to Fisher et al.

When oxidizing such waste sulfite liquor to produce vanillin, the addition of an alkaline buffer to the oxidation reaction mixture increases the vanillin yield. This has been disclosed by Sorensen in United States Patent No. 2,752,394. After the oxidation step, the vanillin is extracted by means of a suitable extraction agent for example, trichloroethylene, benzene or ether.

The residue remaining after the extraction of the vanillin is an aqueous liquor containing various organic materials including acetic acid and sodium compounds. It is a further object of the present invention to provide a process for recovering from this residue a purified sodium hydroxide solution that can be recycled to the oxidation step.

The present invention resides in the concept of a process for recovering a solution of sodium hydroxide from a waste liquor comprising a solution of sodium carbonate and sodium sulfate including the steps of: (1) adding a recycled solution of sodium carbonate to an aqueous waste liquor containing dissolved sodium carbonate and sodium sulfate; (2) adding lime to the solution of sodium carbonate and sodium sulfate with the resultant precipitation of calcium carbonate and the formation of sodium hydroxide in the supernatant liquor; (3) separating the precipitated calcium carbonate from the supernatant liquor; (4) evaporating water from the separated supernatant liquor with resultant formation of a precipitate predominantly of sodium sulfate and some sodium carbonate and a supernatant solution of sodium hydroxide; (5) separating said solution of sodium hydroxide from the precipitated sodium carbonate and sodium sulfate mixture; (6) mixing the solid sodium carbonate and sodium sulfate mixture with water and recycled barium carbonate with the resultant formation of a barium sulfate precipitate and a supernatant solution of sodium carbonate; (7) separating said solution of sodium carbonate from said precipitated barium sulfate; (8) recycling said separated sodium carbonate solution to said previously-recited addition step (1); (9) heating said barium sulfate with a reducing agent to produce barium sulfide; (10) mixing said barium sulfide with a mixture of water and carbon dioxide that forms carbonic acid to form barium carbonate and hydrogen sulfide; and, (11) recycling said last formed barium carbonate back to said previously-recited step (6) of mixing barium carbonate with water, sodium sulfate and sodium carbonate.

By the mixing of step (6) of barium carbonate with sodium sulfate, the sodium sulfate is converted into sodium carbonate. The total sodium carbonate is then recycled for conversion into sodium hydroxide by the action of lime in step (2). Thus a high, efficient yield of sodium hydroxide is obtained from the waste liquor.

The term "reducing agent," as used herein, means a substance capable of reducing barium sulfate to barium sulfide and is illustrated by carbon, carbon monoxide, hydrogen gas, methane, and the like.

The hydrogen sulfide obtained in step (10) above, can be used as such or converted to sulfur dioxide by oxidation with oxygen; converted to elemental sulfur by known procedures; or converted by known procedures to sulfur trioxide which can be used to make sulfuric acid.

The starting material for the process of the invention, which is an aqueous solution of sodium carbonate and sodium sulfate, can be prepared by flameless combustion, employing wet-air oxidation, as disclosed in United States Patents No. 2,665,249 to Zimmermann and 2,696,424 to E. W. Schoeffel, of waste pulping liquor or the residual liquor from the production of vanillin from waste sulfite liquor obtained as set forth in United States Patent 2,598,311 to E. W. Schoeffel.

The attached drawing is a flow sheet diagrammatically illustrating a physical embodiment of the invention wherein the invention is applied to the production of vanillin from waste sulfite liquor.

In the example illustrated in the attached flow sheet, the starting material is 302,500 liters of an alcohol-stripped fermented waste sulfite liquor containing 120 grams per liter of solids, 927 grams per liter of water, 9.82 grams per liter of lime, 8.74 grams per liter of sulfur, and having a specific gravity of 1.048.

Recycled sodium hydroxide solution is added to the starting material to form a mixture having a volume of 330,000 liters, a specific gravity of 1.186 and the following composition:

| Material | Grams per liter | Kilograms |
| --- | --- | --- |
| Waste sulfite liquor solids | 110 | 36,300 |
| Total solids | 236 | 77,870 |
| Chemical Oxygen Demand | 165.6 | 54,615 |
| Caustic NaOH | 100.0 | 33,000 |
| Total NaOH | 111.75 | 36,878 |
| Total Sulfur | 10.7 | 3,531 |
| Acetic Acid | 7.5 | 2,475 |
| CaO | 9.0 | 2,970 |
| Water | 950.0 | 313,418 |

The mixture is then passed to an oxidation zone where it is partially oxidized to produce vanillin. In the oxidation zone, 8,486 kilograms of oxygen are introduced into the mixture. 1500 kilograms of vanillin, equivalent to 2685 kilograms of chemical oxygen demand, are removed from the oxidation zone. 1980 kilograms of NaOH and 101,045 kilograms of water are removed from the mixture in the oxidation zone.

The residual liquor from the oxidation zone has a volume of 248,094 liters, a specific gravity of 1.192 and the following composition:

| Material | Grams per liter | Kilograms |
|---|---|---|
| Total solids | 336.0 | 83,299 |
| Chemical oxygen demand | 175.0 | 43,444 |
| Total NaOH | 140.6 | 34,898 |
| Total Sulfur | 14.24 | 3,531 |
| Acetic Acid | 10.0 | 2,475 |
| CaO | 12.0 | 2,970 |
| Water | 856.0 | 212,373 |

The residual liquor is diluted by the addition of recycled wash water to a total volume of 349,000 liters, having a specific gravity of 1.160 and containing 321,600 kilograms of water.

The diluted residual liquor is then passed to the wet-air oxidation zone. An oxygen-containing gas, such as air, is pumped into the wet-air oxidation zone. In the wet-air oxidation zone, the organic materials are oxidized according to the process of United States Patent No. 2,665,-249 to F. J. Zimmermann. In the wet-air oxidation zone, maintain a temperature of 285–300 degrees centigrade and a reaction pressure of approximately 1800 pounds per square inch. Remove 163,100 kilograms of steam from the wet-air oxidation zone. Remove a concentrated liquid from the wet-air oxidation zone having a volume of 174,500 liters, a specific gravity of 1.264, and the following composition:

| Material | Grams per liter | Kilograms |
|---|---|---|
| Total solids | 356 | 62,118 |
| Chemical oxygen demand | 29.3 | 5,115 |
| Total NaOH | 200 | 34,898 |
| Total Sulfur | 20.22 | 3,531 |
| Acetic acid | 14.2 | 2,475 |
| CaO | 17.0 | 2,970 |
| Water | 908.0 | 158,500 |

Blend the concentrated liquid with a recycled aqueous solution of sodium carbonate to obtain a mixer feed having a volume of 281,900 liters, a specific gravity of 1.232 and the following composition:

| Material | Grams per liter | Kilograms |
|---|---|---|
| Total solids | 293.5 | 82,788 |
| Chemical oxygen demand | 18.1 | 5,115 |
| Total NaOH | 192.0 | 54,139 |
| NaOH as alkali | 142.4 | 40,129 |
| NaOH equivalent to sulfur content | 43.8 | 12,358 |
| NaOH equivalent to acetic acid content | 5.9 | 1,650 |
| Total sulfur | 17.52 | 4,943 |
| Water | 938.5 | 264,602 |

Pass the blended mixture to a wet calciner. Heat the mixture therein for 3 hours at a temperature of 98 degrees centigrade.

Then pass the mixture to a mixer where the mixture is caustified by the addition of lime. Add 30,899 kilograms of lime to the mixture and agitate the mixture thoroughly. A precipitate of calcium carbonate forms and dissolved sodium hydroxide is formed in the solution. Pass the mixture through a filter. Wash the filtered solid with 109,227 kilograms of wash water. The filtered solid cake includes 54,960 kilograms of calcium carbonate, 4,080 kilograms of calcium hydroxide, 29,170 kilograms of water, and 330 kilograms of sodium hydroxide. Recycle the 109,227 kilograms of wash water to mix with the feed for the wet-air oxidizer.

The filtrate from the foregoing filtration is a dilute caustic liquor having a volume of 249,000 liters, a specific gravity of 1.220, and the following composition:

| Material | Grams per liter | Kilograms |
|---|---|---|
| Total solids | 272.0 | 67,654 |
| Chemical oxygen demand | 20.6 | 5,115 |
| Total NaOH | 216.1 | 53,809 |
| Caustic NaOH | 143.7 | 35,786 |
| NaOH as carbonate | 16.1 | 4,013 |
| NaOH equivalent to sulfur content | 49.7 | 12,358 |
| NaOH equivalent to acetic acid content | 6.6 | 1,650 |
| Total sulfur | 19.9 | 4,943 |
| Water | 948.0 | 235,432 |

Pass this dilute caustic liquor to the evaporator. Heat the mixture to boil off 195,912 kilograms of steam. The resulting concentration of the residue causes a precipitation of sodium sulfate and sodium carbonate. Filter the residue to separate a mixture of solid sodium sulfate and sodium carbonate in the form of a thick slurry. The filtrate is an approximately 50 percent solution of sodium hydroxide containing 5,115 kilograms of chemical oxygen demand; 36,878 kilograms total of sodium hydroxide; 33,000 kilograms of sodium hydroxide present as caustic; 2228 kilograms of sodium hydroxide equivalent to sulfur content; 1,650 kilograms of sodium hydroxide equivalent to acetic acid content; 891 kilograms of total sulfur; 2,475 kilograms of acetic acid, and 33,000 kilograms of water.

Recycle this filtrate back to the waste sulfite liquor feed for the production of vanillin. The sodium hydroxide solution acts as an alkaline buffer during the production of vanillin and increases the yield of vanillin.

The solid filter cake mixture of sodium sulfate and sodium carbonate contains 6520 kilograms of water, 16,931 kilograms of total sodium hydroxide; 6,799 kilograms of sodium hydroxide; 10,132 kilograms of sodium hydroxide equivalent to sulfur content; and a total sulfur content of 4,052 kilograms.

Pass this filtered mixture of sodium sulfate and sodium carbonate to a mixer. Add about 4,118 kilograms of make-up sodium sulfate. Flow into the mixer a recycled barium carbonate slurry comprising 30,690 kilograms of barium carbonate; 6,501 kilograms of barium sulfate; a total sulfur content of 891 kilograms; and a water content of 125,382 kilograms. Add 2,160,000 standard liters of nitrogen gas and 381,000 standard liters containing 7,480 kilograms of carbon dioxide gas. Agitate the contents of the mixer to form a precipitate of barium sulfate. Add 6,645 kilograms of coke containing about 88 percent carbon at 80 degrees centigrade to the resulting mixture. Filter the mixture. The separated filtrate has a volume of 110,000 liters; a specific gravity of 1,210; a total solids content of 27,070 kilograms; a total sodium hydroxide content of 19,241 kilograms; a content of sodium hydroxide present as sodium carbonate of 15,708 kilograms; a content of sodium hydroxide present as sulfate of 3,531 kilograms; a total sulfate content of 1,412 kilograms; and a water content of 106,102 kilograms. Recycle this filtrate to serve as a recycled solution of sodium carbonate. Blend the recycled filtrate to obtain a feed for the caustification step, as previously-recited.

Wash the filter cake with 125,382 kilograms of water. Pass the washings on to serve as a part of the feed for the carbonation reactor.

The filter cake includes 6645 kilograms of coke; 8,712 kilograms of barium carbonate; 32,505 kilograms of barium sulfate; 4,455 kilograms of sulfur present as sulfate; and 25,800 kilograms of water. Pass the filter cake to a kiln. Heat the contents of the kiln to a temperature between about 700 degrees centigrade and 1150 degrees centigrade, preferably about 850 degrees centigrade. Withdraw from the kiln a mixture of 8,712 kilograms of barium carbonate; 18,860 kilograms of barium sulfide; and 6,501 kilograms of barium sulfate; having a total sulfur content of 4,455 kilograms. Add to this mixture the 125,382 kilograms of wash water from the previous filtration of barium sulfate.

Pass this barium sulfide mixture to the carbonation reactor. Inject into the carbonation reactor 33,267,000 standard liters of gas at 85 degrees centigrade comprising 15 percent carbon dioxide and 85 percent nitrogen. Withdraw from the top of the carbonation reactor 33,267,000 standard liters of gas comprising 7.5 percent hydrogen sulfide, 7.5 percent carbon dioxide, and 85.0 percent nitrogen containing a sulfur content of 3,564 kilograms. The hydrogen sulfide can be converted to sulfur dioxide by oxidation with oxygen gas. Withdraw from the bottom of the carbonation reactor the barium carbonate slurry previously recited. Recycle this barium carbonate slurry to the mixing with the filter cake of sodium carbonate and sodium sulfate.

It is thus seen that the invention provides a process for efficiently recovering sodium compounds from waste industrial liquors.

The invention can be embodied in other specific forms without departing from the spirit or essential characteristics thereof. The foregoing physical embodiments are therefore to be considered in all respects illustrative and not restrictive. The scope of the invention is indicated by the subjoined claims rather than by the foregoing description. All changes which come within the meaning and range of equivalency of the claims are therefore intended to be embraced therein.

We claim:

1. In a process for recovering an aqueous sodium hydroxide solution from an industrial waste liquor, the steps including: adding a recycled solution of sodium carbonate to an aqueous industrial residue consisting essentially of a solution of dissolved sodium carbonate and sodium sulfate; adding lime to the thus formed solution of sodium carbonate and sodium sulfate with the resultant precipitation of calcium carbonate and the formation of sodium hydroxide in the supernatant liquor; separating the precipitated calcium carbonate from the supernatant liquor; evaporating water from said separated supernatant liquor with resultant formation of a precipitate of sodium sulfate and sodium carbonate and a supernatant solution of sodium hydroxide; separating said solution of sodium hydroxide from the precipitated sodium carbonate and sodium sulfate; mixing said solid sodium carbonate and sodium sulfate with water and recycled barium carbonate with the resultant formation of a barium sulfate precipitate and a supernatant solution of sodium carbonate; separating said solution of sodium carbonate from said precipitated barium sulfate; recycling said separated sodium carbonate solution to said previously-recited addition step; heating said barium sulfate with a reducing agent to produce barium sulfide; mixing said barium sulfide with an aqueous solution of carbonic acid to form barium carbonate and hydrogen sulfide; and, recycling said last-formed barium carbonate back to said previously-recited step of mixing barium carbonate with water, sodium sulfate and sodium carbonate.

2. In a process for recovering sodium values from industrial waste liquor, the steps comprising: adding barium carbonate to an aqueous industrial waste liquor consisting essentially of a solution of sodium sulfate and sodium carbonate with the resultant production of a barium sulfate precipitate and a supernatant aqueous solution of sodium carbonate; separating said supernatant solution from said solid barium sulfate precipitate; heating said separated barium sulfate with a reducing agent to form barium sulfide; mixing said barium sulfide with an aqueous solution of carbonic acid to form barium carbonate and recycling said barium carbonate to said previously-recited barium carbonate addition step.

3. In a process for recovering purified solutions of sodium compounds from industrial waste liquor, the steps comprising: adding barium carbonate to an aqueous industrial waste liquor consisting essentially of a solution of sodium sulfate and sodium carbonate with the resultant production of a barium sulfate precipitate and a supernatant aqueous solution of sodium carbonate; separating said supernatant solution from said solid barium sulfate precipitate; heating said separated barium sulfate with a reducing agent to form barium sulfide; mixing said barium sulfide with an aqueous solution of carbonic acid to form barium carbonate and hydrogen sulfide; oxidizing hydrogen sulfide to form sulfur dioxide; and, recycling said barium carbonate to said previously-recited barium carbonate addition step.

4. A process for treating waste wood-pulping liquors comprising aqueous solutions of sodium compounds which includes the steps: introducing an oxygen-containing gas and a wood-pulping waste liquor containing dissolved sodium compounds into an oxidizing zone; heating said mixture to oxidize the industrial waste and produce a solution of sodium carbonate and sodium sulfate; adding recycled sodium carbonate solution to the effluent from said oxidation; adding lime to the mixture thus-formed with the resultant precipitation of calcium carbonate and the formation of sodium hydroxide in the supernatant liquor; separating the precipitated calcium carbonate from the supernatant liquor; evaporating water from said separated supernatant liquor with resultant formation of a precipitate of sodium sulfate and sodium carbonate and a supernatant solution of sodium hydroxide; separating said solution of sodium hydroxide from the precipitated sodium carbonate and sodium sulfate; mixing said separated mixture of sodium sulfate and sodium carbonate with water and recycled barium carbonate with the resultant formation of a barium sulfate precipitate and a supernatant solution of sodium carbonate; separating said solution of sodium carbonate from said precipitated barium sulfate; recycling said solution of sodium carbonate to said previously-recited step of adding recycled sodium carbonate; heating said separated barium sulfate with carbon to produce barium sulfide; mixing said barium sulfide with an aqueous solution of carbonic acid to form barium carbonate and, recycling said last-formed barium carbonate back to said previously-recited step of mixing barium carbonate with water, sodium sulfate and sodium carbonate.

References Cited in the file of this patent

UNITED STATES PATENTS

| | | |
|---|---|---|
| 2,003,734 | Broadhurst | June 4, 1935 |
| 2,069,185 | Hibbert et al. | Jan. 26, 1937 |
| 2,072,177 | Moore | Mar. 2, 1937 |
| 2,094,902 | Muller | Oct. 5, 1937 |
| 2,383,247 | Gardner | Aug. 21, 1945 |
| 2,774,666 | Barton | Dec. 18, 1956 |